(12) United States Patent
Kim

(10) Patent No.: US 7,766,305 B2
(45) Date of Patent: Aug. 3, 2010

(54) RECTANGULAR GATE VALVE

(75) Inventor: Bae-Jin Kim, Suwon (KR)

(73) Assignee: Presys Co., Ltd., Suwon, Kyunggi-Do (KR)

( * ) Notice: Subject to any disclaimer, the term of this patent is extended or adjusted under 35 U.S.C. 154(b) by 397 days.

(21) Appl. No.: 11/780,108

(22) Filed: Jul. 19, 2007

(65) Prior Publication Data
US 2008/0237513 A1 Oct. 2, 2008

(30) Foreign Application Priority Data
Mar. 29, 2007 (KR) ...................... 10-2007-0030924

(51) Int. Cl.
*F16K 25/00* (2006.01)
(52) U.S. Cl. ...................... 251/203; 251/158; 251/326; 251/62
(58) Field of Classification Search .................. 251/62, 251/193, 326, 158, 194, 203, 204
See application file for complete search history.

(56) References Cited

U.S. PATENT DOCUMENTS 5,626,324 A * 5/1997 Nakamura et al. .......... 251/158
5,755,255 A * 5/1998 Iwabuchi ..................... 251/158
6,082,706 A * 7/2000 Irie ............................. 251/158
6,237,892 B1 * 5/2001 Ito ............................... 251/193
6,331,152 B1 * 12/2001 Holle ............................. 482/4
7,066,443 B2 * 6/2006 Ishigaki ....................... 251/195
7,100,892 B2 * 9/2006 Iwabuchi ..................... 251/187
7,198,251 B2 * 4/2007 Kondoh ....................... 251/193

FOREIGN PATENT DOCUMENTS

KR      1020040004195      1/2004

* cited by examiner

*Primary Examiner*—John K Fristoe, Jr.
*Assistant Examiner*—Andrew J Rost
(74) *Attorney, Agent, or Firm*—IPLA P.A.; James E. Bame

(57) ABSTRACT

A rectangular gate valve having an improved driving action is disclosed. The rectangular gate valve of the present invention includes a sealing member, which opens or closes a wafer moving passage, a main shaft, which is coupled to the sealing member and has a guide member, and a housing bracket, which has a first guide slot, into which the guide member is inserted. The gate valve further includes a valve drive unit, which is provided in the housing bracket and has an air cylinder, a piston, a piston shaft, a moving unit and a connection link. The gate valve further includes a guide bracket, which has a vertical bracket, a second guide slot and a horizontal bracket. The gate valve further includes a guide link, which is moved along the second guide slot to guide movement of the main shaft.

2 Claims, 7 Drawing Sheets

RECTANGULAR GATE VALVE

FOREIGN PRIORITY CLAIMING

Applicant claims foreign priority under Paris Convention and 35 U.S.C. §119 to a Korean Patent Application No. 10-2007-0030924, filed Mar. 29, 2007 with the Korean Intellectual Property Office.

BACKGROUND OF THE INVENTION

1. Field of the Invention

The present invention relates, in general, to rectangular vacuum gate valves, and, more particularly, to a rectangular vacuum gate valve having an improved driving action, in which a first guide slot precisely guides the upward and downward movement of the valve, and a cane head shaped second guide slot, the upper end of which is curved, precisely guides forward and backward movement of the valve, thus reliably realizing an L-shaped two-stepped driving action of a main shaft.

2. Description of the Related Art

A slit valve was proposed in Korean Patent Application No. 10-2003-0071906 (title: SLIT VALVE), which was filed by the applicant of the present invention, the slit valve being constructed such that the structure of a sealing member, disposed around a wafer moving passage, is improved so that the sealing member, which openably closes the wafer moving passage, is prevented from being damaged, and the state of the valve, when operated, can be observed using an indicator provided in a valve drive unit.

FIG. 1 is a sectional view showing the conventional slit valve. Referring to FIG. 1, the slit valve of No. 10-2003-0071906 includes a sealing member 100, which opens or closes a wafer moving passage, a housing bracket 200, which is provided separately from the sealing member 100, a main shaft 400, which extends a predetermined length between the sealing member 100 and the housing bracket 200, and a valve drive unit 300, which is provided in the housing bracket 200. The valve drive unit 300 includes air cylinders 310, which are operated by air pressure, pistons 320, which are provided in the respective air cylinders 310, piston shafts 330, which are coupled to the respective pistons 320, a moving unit 340, which is coupled to the piston shafts 330, and a link 350, which is connected between the moving unit 340 and the main shaft 400.

In the conventional slit valve having the above-mentioned construction, the pistons 320 of the air cylinders 310, which are provided in the housing bracket 200, are moved upwards or downwards, depending on a change in the pressure of compressed air supplied into the air cylinders 310. At this time, the moving unit 340 is moved along with the pistons 320. Simultaneously, the main shaft 400, which is coupled to the moving unit 340 through the link 350, is also moved upwards or downwards. Thereby, the sealing member 100 opens or closes the wafer moving passage.

Furthermore, as shown in FIG. 2, the valve drive unit 300 of the slit valve conducts a first driving step of moving the main shaft 400 upwards or downwards and a second driving step of moving the main shaft 400 forwards or backwards to open or close the wafer moving passage using the sealing member 100, that is, conducts an L-shaped driving action. To realize the L-shaped driving action, a guide slot having an shape is formed in the valve drive unit 300.

However, because the links 350 structurally form curved moving paths, in the case of the guide slot having a right-angled L shape, that is, having linear moving tracks, there is a problem in that it is difficult to precisely and smoothly guide the L-shaped driving movement of the valve drive unit 300.

Furthermore, as shown in FIG. 2, in the case where the link 350 is guided by the guide slot 351 having the right-angled L shape, stress concentration is induced at the corners of the link and the guide slot by repeated friction. In addition, when the link, which is inserted into the guide slot, is rotated around the corner of the guide slot, a small clearance undesirably occurs, as shown in FIG. 2. Thus, there is a problem in that the movement of the sealing member for opening or closing the wafer moving passage may not be precisely controlled.

SUMMARY OF THE INVENTION

Accordingly, the present invention has been made keeping in mind the above problems occurring in the prior art, and an object of the present invention is to provide a rectangular vacuum gate valve having an improved driving action, in which a first guide slot precisely guides the upward and downward movement of the valve, and a cane head shaped second guide slot, the upper end of which is curved, precisely guides forward and backward movement of the valve, thus reliably realizing an L-shaped two-stepped driving action of a main shaft.

In order to accomplish the above object, the present invention provides a rectangular vacuum gate valve, including: a sealing member for opening and closing a wafer moving passage; a main shaft coupled at an upper end thereof to the sealing member, with a guide member protruding from a sidewall of the main shaft; a housing bracket, having therein a first guide slot, which is vertically formed in the housing bracket, and into which the guide member of the main shaft is inserted; a valve drive unit provided in the housing bracket, and having an air cylinder to be operated by pressure of air, a piston provided in the air cylinder, a piston shaft coupled to the piston; a moving unit coupled to the piston shaft, and a connection link connected between the moving unit and the main shaft; a guide bracket, having: a vertical bracket extending downwards from a lower surface of the housing bracket, with a second guide slot formed in a longitudinal surface of the vertical bracket, and a horizontal bracket coupled to a lower end of the vertical bracket; and a guide link coupled at a first end thereof to a circumferential outer surface of the main shaft and inserted at a second end thereof into the second guide slot, the guide link being moved along the second guide slot to guide movement of the main shaft.

Preferably, the second guide slot may have a cane head shape, an upper end of which is curved.

Furthermore, the rectangular gate valve may further include a sensor provided on a circumferential outer surface of the moving unit to detect a position of the moving unit.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
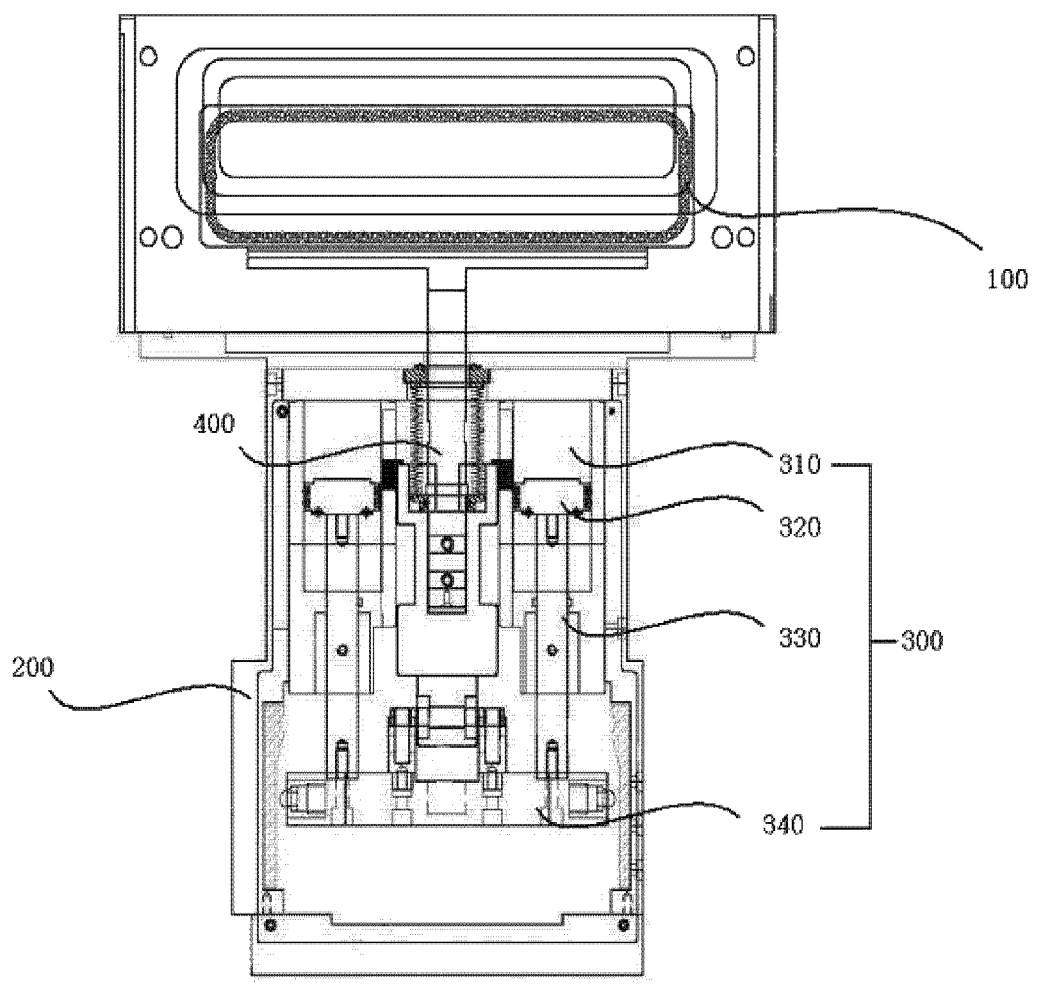
FIG. 1 is a sectional view showing the construction of a conventional slit valve.

Hereinafter, a preferred embodiment of the present invention will be described in detail with reference to the attached drawings. Reference should now be made to the drawings, in which the same reference numerals are used throughout the different drawings to designate the same or similar components.

Figure 3:
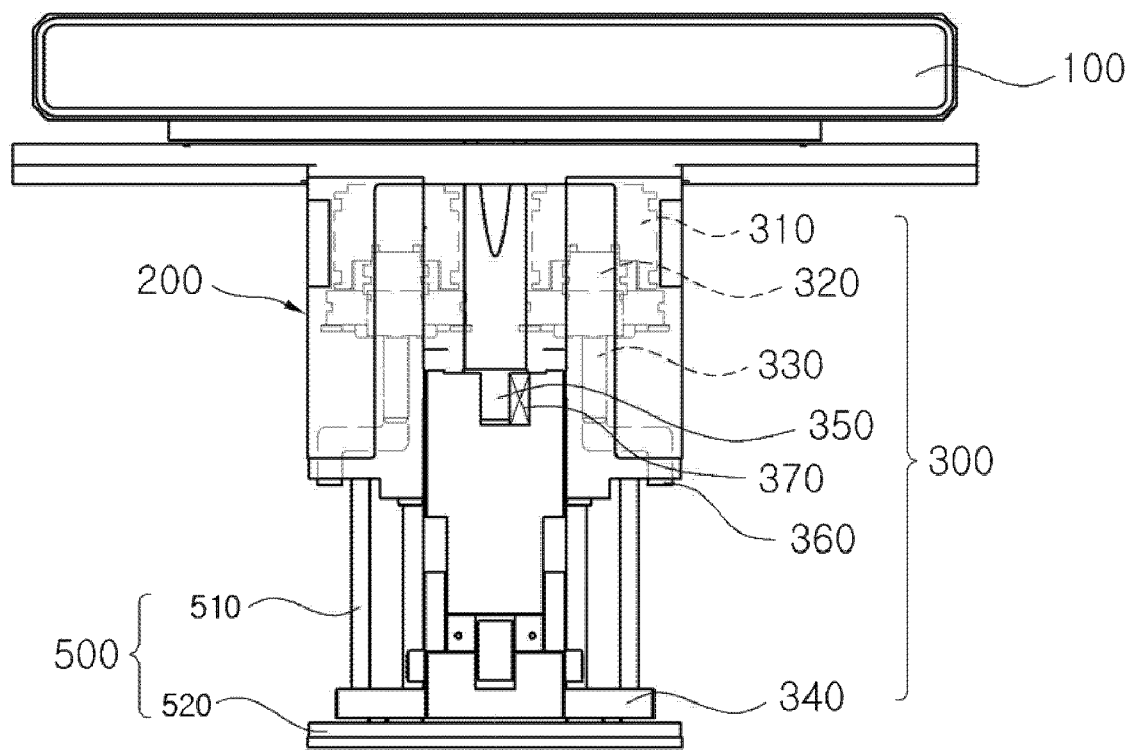
FIG. 3 is a view illustrating the operation of a rectangular vacuum gate valve, when a wafer moving passage of the valve is opened, according to a preferred embodiment of the present invention.
Figure 4:
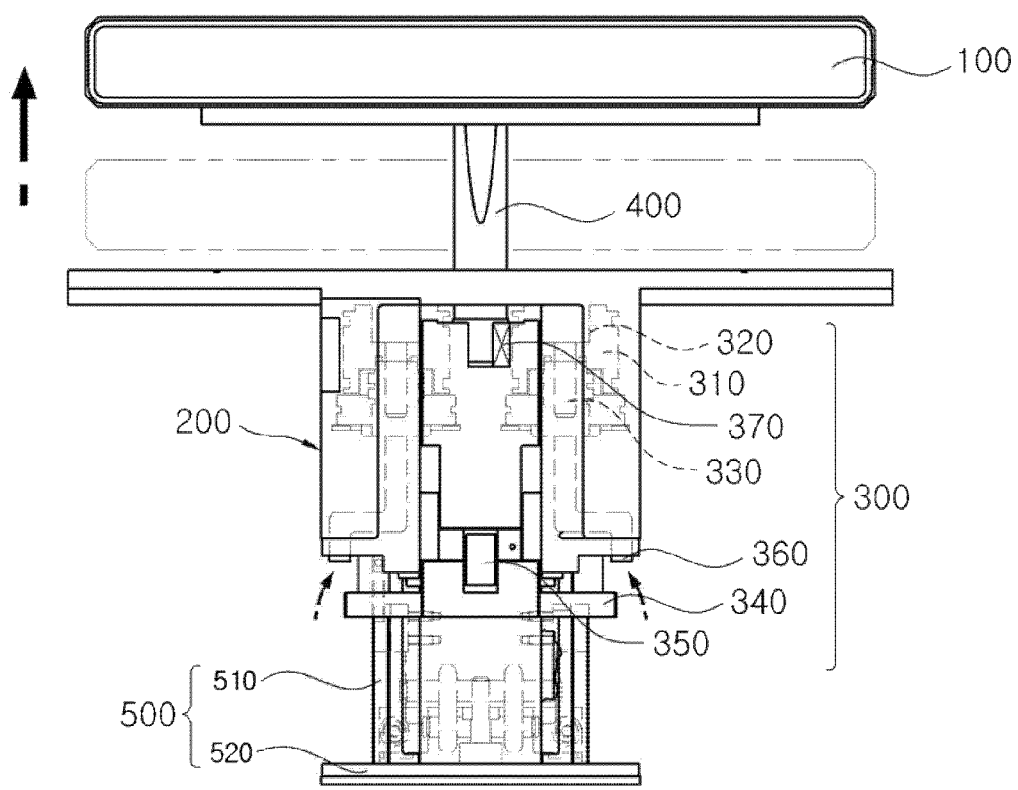
FIG. 4 is a view illustrating the operation of the rectangular vacuum gate valve, when the wafer moving passage is closed, according to the preferred embodiment of the present invention.
Figure 5:
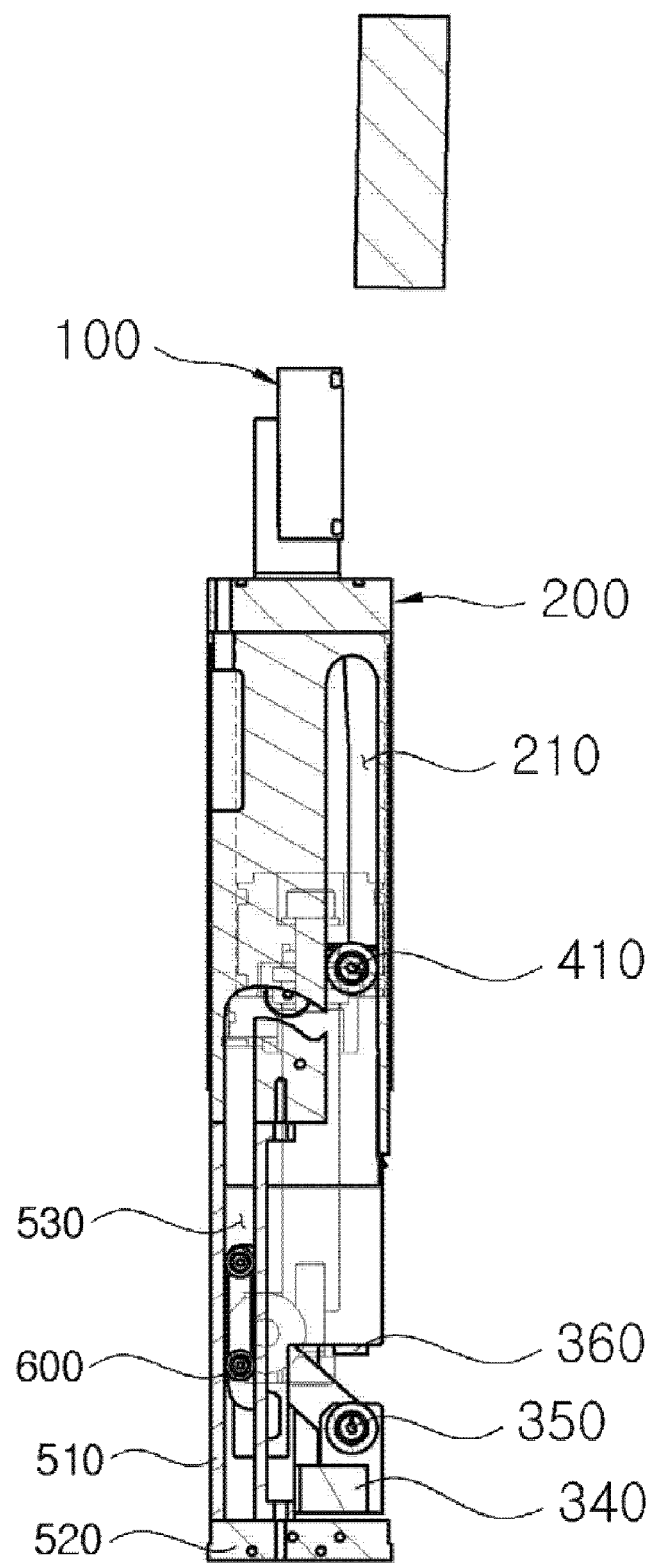
FIGS. 5 through 7 are side sectional views illustrating the operation of the rectangular vacuum gate valve according to the preferred embodiment of the present invention.
Figure 6:
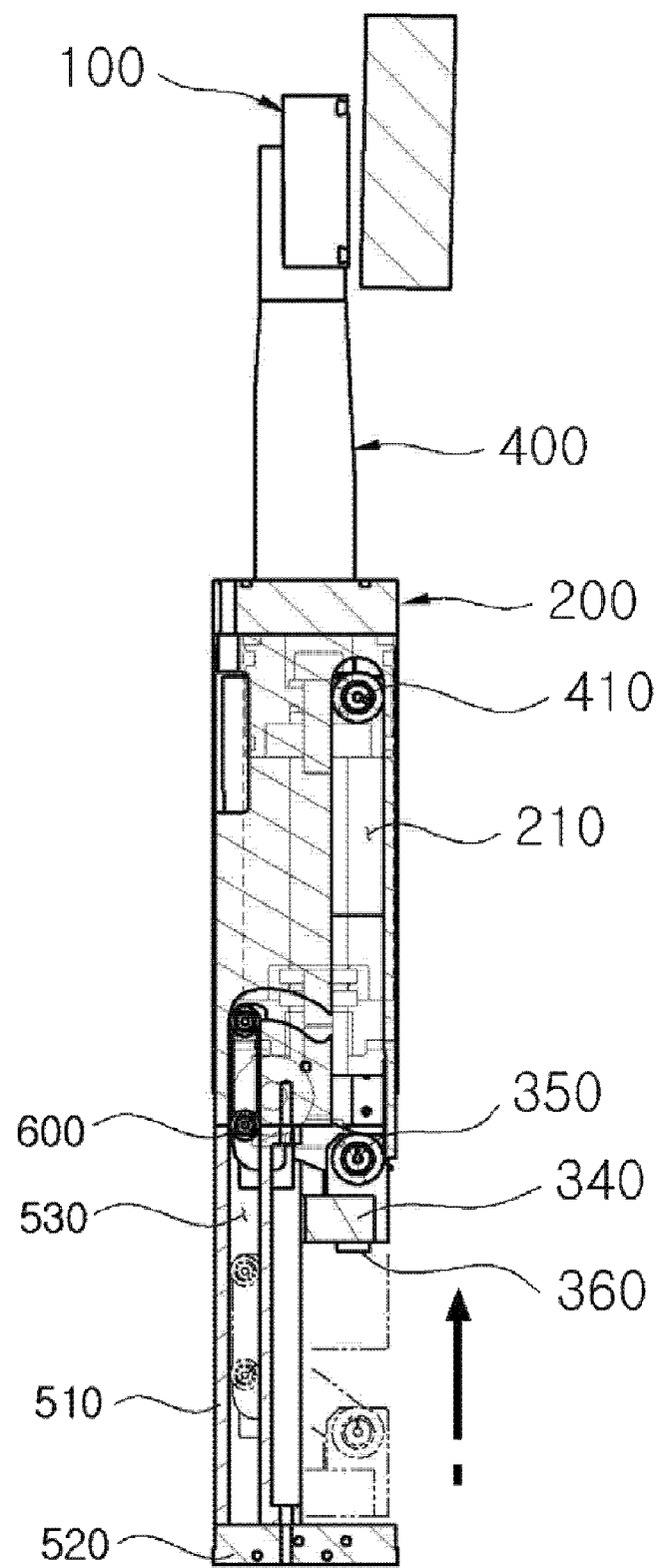
Figure 7:
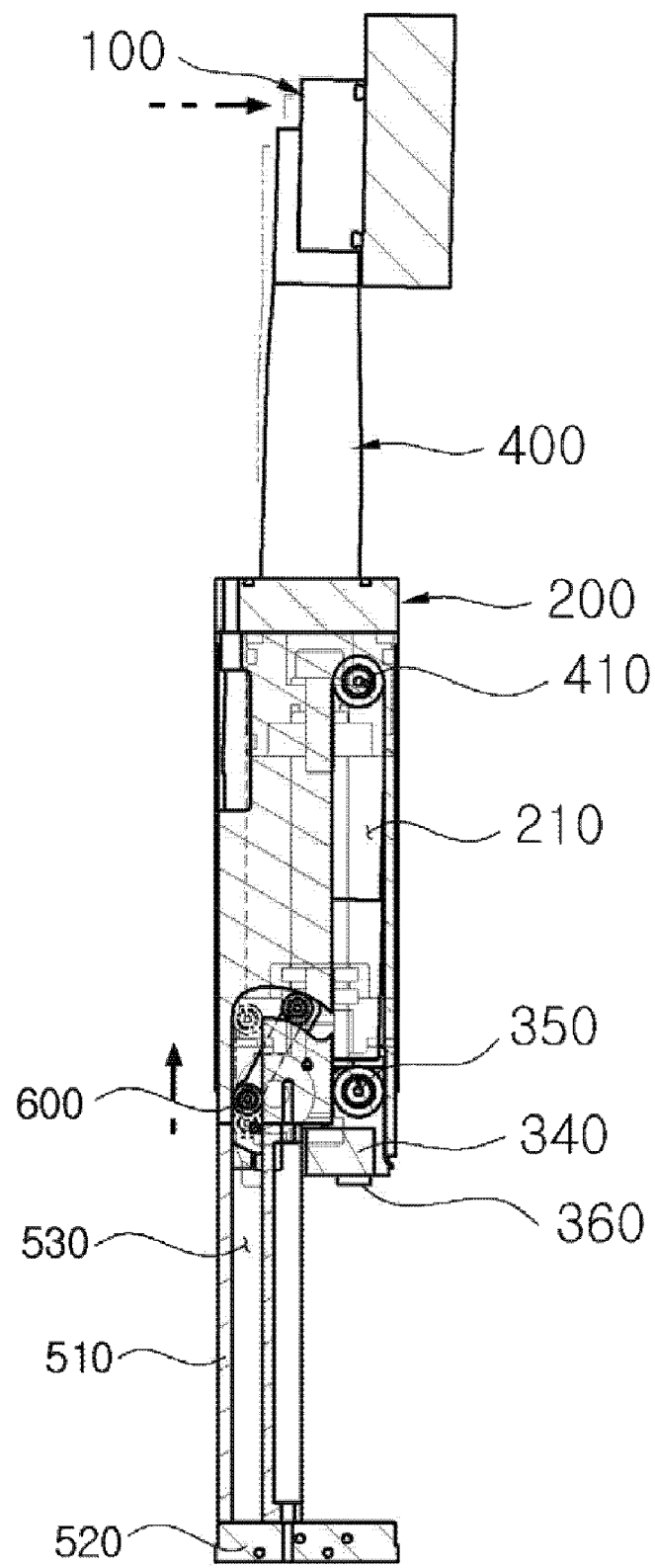

FIGS. 3 and 4 are views illustrating the operation of a rectangular vacuum gate valve according to a preferred embodiment of the present invention. FIGS. 5 through 7 are side sectional views illustrating the operation of the rectangular vacuum gate valve according to the preferred embodiment of the present invention. The rectangular vacuum gate valve of the present invention includes a sealing member 100, a housing bracket 200, a valve drive unit 300, a main shaft 400, a guide bracket 500, and guide links 600. The rectangular vacuum gate valve has first guide slots 210, air cylinders 310, pistons 320, piston shafts 330, a moving unit 340, a connection link 350, compressed air inlets 360, a sensor 370, guide members 410, vertical brackets 510, a horizontal bracket 520, and second guide slots 530.

The sealing member 100 is coupled to the upper end of the main shaft 400, which will explained later herein, so that the sealing member 100 opens or closes a wafer moving passage (not shown), depending on the movement of the main shaft 400 along an L-shaped moving track, along which the main shaft 400 moves in upward and downward directions and in forward and rearward directions.

The housing bracket 200 is provided separately from the sealing member 100, and has therein the valve drive unit 300, which will be explained in detail later herein. Furthermore, the guide bracket 500, which will be explained in detail later herein, is provided under the lower surface of the housing bracket 200.

Meanwhile, the first guide slots 210 are vertically formed in the housing bracket 200. The guide members 410 of the main shaft 400 are inserted into respective first guide slots 210. The first guide slots 210 thus serve to guide vertical movement of the main shaft 400.

The valve drive unit 300 includes the air cylinders 310, the pistons 320, the piston shafts 330, the moving unit 340, the connection link 350, the compressed air inlets 360, and the sensor 370. Each piston 320, which is operated by the pressure of air drawn into the corresponding compressed air inlet 360, and each piston shaft 330, which is coupled to the corresponding piston 320 and vertically reciprocates in a direction parallel to the longitudinal direction of the housing bracket 200, are provided together in a corresponding air cylinder 310.

Furthermore, the moving unit 340 is coupled to the piston shaft 330, and thus reciprocates in the same direction as the piston shaft 330, that is, in a vertical direction. The sensor 370 is provided on the circumferential outer surface of the moving unit 340. The sensor 370 is constructed such that it can detect vertical movement of the moving unit 340. For example, it is preferably constructed such that the position of the moving unit 340 can be detected using a magnet (not shown), in other words, using the magnetic field defined by the magnet.

The connection link 350 is coupled at a first end thereof to the moving unit 340, and is coupled at a second end thereof to the main shaft 400, which will be explained later herein. Thus, the connection link 350 guides vertical reciprocation of the main shaft 400 depending on the change in pressure in the air cylinder 310.

The sealing member 100 is coupled to the upper end of the main shaft 400. Power is transmitted from the moving unit 340 of the valve drive unit 300 to the lower end of the main shaft 400 through the connection link 350. The main shaft 400 is vertically moved by the power transmitted thereto. Thereby, the sealing member 100, which is coupled to the upper end of the main shaft 400, is moved in a vertical direction along with the main shaft 400.

Meanwhile, the guide links 600 are provided on the circumferential outer surface of the lower end of the main shaft 400 in order to guide upward, downward, forward and backward movement of the sealing member 100 and the main shaft 400.

Furthermore, the guide members 410 protrude from the respective opposite portions of the sidewall of the main shaft 400. The guide members 410 are moved along the first guide slots 210, which are formed in the housing bracket 200.

The guide bracket 500 includes the vertical brackets 510 and the horizontal bracket 520, and has the second guide slots 530 therein.

The vertical brackets 510 extend downwards from respective left and right portions of the lower surface of the housing bracket 200. The second guide slots 530 are longitudinally formed in the respective longitudinal surfaces of the vertical brackets 510, which face each other. Furthermore, the horizontal bracket 520, which connects the vertical brackets 510 to each other, is coupled to the lower ends of the vertical brackets 510. The horizontal bracket 520 serves to prevent the vertical brackets 510 from being bent inwards or outwards by vibrations generated by reciprocation of the main shaft 400 and the valve drive unit 300, thus maintaining the positions of the vertical brackets 510 constant.

Meanwhile, each second guide slot 530 has the shape of a cane head, the upper end of which is curved. The guide links 600 are inserted into the respective second guide slots 530 of the vertical brackets 510 and are moved along the curved shapes of the second guide slots 530, thus guiding upward, downward, forward and backward movement of the main shaft 400 and the sealing member 100.

Figure 2:
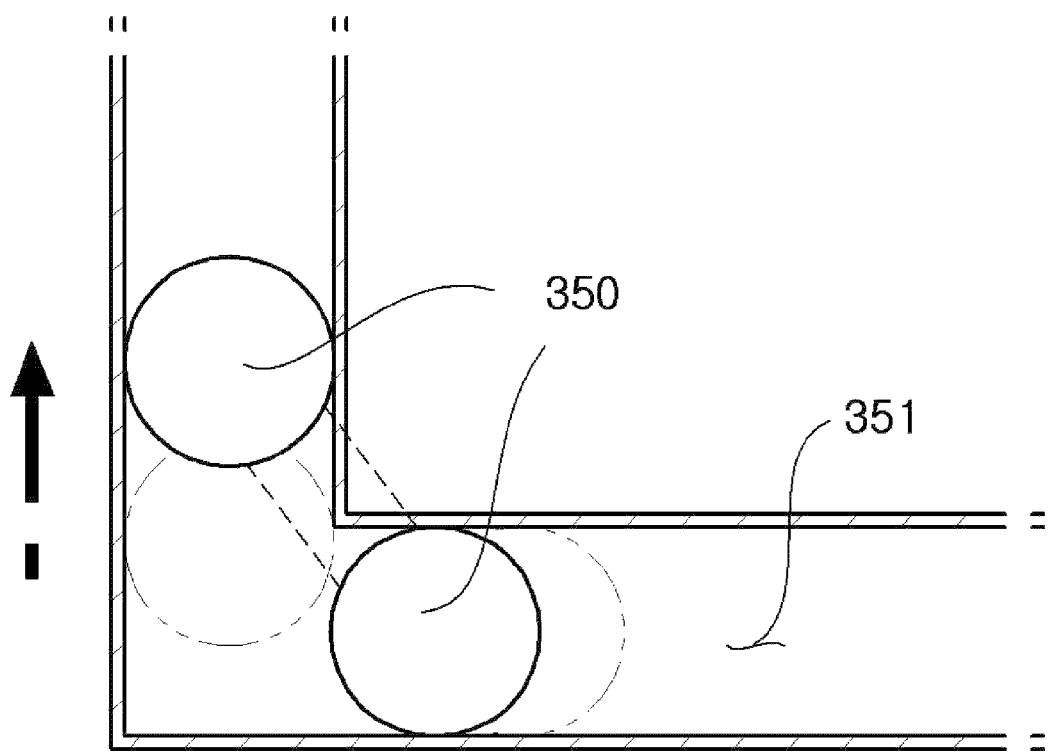
FIG. 2 is a view showing the movement of a link of the conventional slit valve.

The links serve to convert linear movement into rotational movement. Because the link structurally forms a curved moving path when it is moved, in the case of the link of the conventional slit valve, it is difficult to precisely guide vertical movement and horizontal movement, that is, L-shaped two-stepped movement, as shown in FIG. 2. However, in the present invention, because rotational movement of the guide link 600 is converted into forward and backward linear movement through the second guide slots 530, each of which has a cane head shape, without forming undesirable clearance, the main shaft 400 and the sealing member 100, which are provided on the main shaft 400, can be precisely moved forwards or backwards, thus reliably opening or closing the wafer moving passage.

Furthermore, in the conventional slit valve, to guide L-shaped two-stepped movement, a spring (not shown) must be interposed between the moving unit 340 and the main shaft 400. However, in this case, because the elastic force of the spring varies, the L-shaped two-stepped movement cannot be precisely controlled. Unlike the conventional art, the present invention is characterized in that, because the rotational movement of the link is converted into linear movement through the second guide slots, the L-shaped two-stepped movement thereof can be smoothly and precisely conducted despite the absence of a spring.

The guide links 600 are coupled at first ends thereof to the circumferential outer surface of the main shaft 400. Second ends of the guide links 600 are inserted into respective second guide slots 530, the upper ends of which are curved to have cane head shapes, so that the guide links 600 are moved along the second guide slots 530 by the vertical movement of the main shaft 400.

The operation of the rectangular vacuum gate valve having the above-mentioned construction will be described herein below with reference to FIGS. 5 through 7. The following description of the operation of the rectangular vacuum gate will be made with reference to FIGS. 3 and 4, as necessary. Here, the detailed constructions of the components will be skipped, because they have been explained above with reference to FIGS. 3 through 4.

First, the process by which the sealing member closes the wafer moving passage will be explained.

FIG. 5 is a sectional view illustrating the operation of the rectangular vacuum gate valve according to the preferred embodiment of the present invention, showing the open state of the wafer moving passage, that is, a state of the gate valve before it is operated.

In the state of FIG. 5, to close the wafer moving passage, when compressed air is supplied into the compressed air inlets 360, the rectangular vacuum gate valve enters the state of FIG. 6. In detail, the pistons 320, which are provided in the respective air cylinders 310, are moved upwards by the pressure of air supplied into the compressed air inlets 360. When the pistons 320 are moved upwards, the piston shafts 330, which are coupled to the respective piston 320, and the moving unit 340, which are coupled to the piston shafts 330, are simultaneously moved upwards. Furthermore, the connection link 350, which is coupled at the first end thereof to the moving unit 340 and is coupled at the second end thereof to the main shaft 400, is rotated in a counterclockwise direction.

At this time, the main shaft 400, which receives power from the moving unit 340, is vertically moved upwards. When the main shaft 400 is moved upwards, the guide members 410, which protrude from the main shaft 400 in opposite lateral directions and are inserted into the respective first guide slots 210 formed in the inner surface of the housing bracket 200, are moved along the first guide slots 210.

In addition, when the connection link 350 is rotated, the guide links 600, which are inserted into the respective second guide slots 530 of the guide bracket 500, are also moved upwards along the second guide slots 530, and are rotated in a clockwise direction at the upper ends of the second guide slots 530, each of which has a cane head shape, the upper end of which is curved. At this time, the main shaft 400 and the sealing member 100 are moved backwards by the rotation of the guide links 600, thus closing the wafer moving passage, as shown in FIG. 7.

Next, the process by which the sealing member opens the wafer moving passage will be explained herein below.

When in the closed state of FIG. 7, to open the wafer moving passage, when the compressed air, which has been supplied into air cylinders 310 through the compressed air inlets 360, is discharged outside through the compressed air inlets 360, the pressure in the air cylinders 310 is reduced.

Then, the guide links 600, which are inserted in the respective second guide slots 530, are rotated in a counterclockwise direction. Here, just after the guide links 600 are moved away from the curved parts of the second guide slots 530, the guide links 600 are moved in a vertical downward direction and, simultaneously, the guide members 410, which are inserted in the respective first guide slots 210, are moved in a vertical downward direction, thus entering the state of FIG. 6.

As such, when the guide links 600 and the guide members 410 are moved downwards, the moving unit 340 and the main shaft 400, which are coupled to the moving unit 340 through the connection link 350, are simultaneously moved in a vertical downward direction, thus opening the wafer moving passage.

At this time, the connection link 350 is rotated in a clockwise direction.

As described above, the present invention provides a rectangular vacuum gate valve, which is constructed such that a first guide slot precisely guides the upward and downward movement of the valve, and a cane head shaped second guide slot precisely guides the forward and backward movement of the valve. Thus, the present invention has an advantage in that an L-shaped two-stepped driving action of a main shaft can be reliably conducted.

What is claimed is:

1. A rectangular gate valve, comprising:
   a sealing member for opening and closing a wafer moving passage;
   a main shaft coupled at an upper end thereof to the sealing member, with a guide member protruding from a sidewall of the main shaft;
   a housing bracket, having therein a first guide slot, which is vertically formed in the housing bracket, and into which the guide member of the main shaft is inserted;
   a valve drive unit provided in the housing bracket, and comprising: an air cylinder to be operated by pressure of air; a piston provided in the air cylinder; a piston shaft coupled to the piston; a moving unit coupled to the piston shaft; and a connection link connected between the moving unit and the main shaft;
   a guide bracket, comprising: a vertical bracket extending downwards from a lower surface of the housing bracket, with a second guide slot formed in a longitudinal surface of the vertical bracket; and a horizontal bracket coupled to a lower end of the vertical bracket; and
   a guide link coupled at a first end thereof to a circumferential outer surface of the main shaft and inserted at a second end thereof into the second guide slot, the guide link being moved along the second guide slot to guide movement of the main shaft,
   wherein the second guide slot comprises a vertical straight portion and a cane-shaped upper end portion, wherein the vertical straight portion is parallel to the first guide slot, and wherein the vertical straight portion of the second guide slot is connected to the first guide slot with the cane-shaped upper end portion of the second guide slot, so as to obtain an L-shaped two-stepped driving action of the main shaft.

2. The rectangular gate valve according to claim 1, further comprising: a sensor provided on a circumferential outer surface of the moving unit to detect a position of the moving unit.

* * * * *